United States Patent
Schnitzer et al.

(10) Patent No.: US 10,633,014 B2
(45) Date of Patent: Apr. 28, 2020

(54) LOCKING DEVICE FOR AN ADJUSTABLE STEERING COLUMN OF A MOTOR VEHICLE

(71) Applicants: THYSSENKRUPP PRESTA AG, Eschen (LI); thyssenkrupp AG, Essen (DE)

(72) Inventors: Hieronymus Schnitzer, Gamprin (LI); Ciprian Paltinisanu, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 69 days.

(21) Appl. No.: 15/742,413

(22) PCT Filed: Jun. 28, 2016

(86) PCT No.: PCT/EP2016/064936
§ 371 (c)(1),
(2) Date: Jan. 5, 2018

(87) PCT Pub. No.: WO2017/005535
PCT Pub. Date: Jan. 12, 2017

(65) Prior Publication Data
US 2018/0201295 A1 Jul. 19, 2018

(30) Foreign Application Priority Data
Jul. 7, 2015 (DE) .................. 10 2015 212 688

(51) Int. Cl.
*B62D 1/184* (2006.01)
*B62D 1/187* (2006.01)
*B62D 1/19* (2006.01)

(52) U.S. Cl.
CPC ............. *B62D 1/184* (2013.01); *B62D 1/187* (2013.01); *B62D 1/19* (2013.01)

(58) Field of Classification Search
CPC ...................................... B62D 1/184
See application file for complete search history.

(56) References Cited

U.S. PATENT DOCUMENTS

| 5,787,759 A * | 8/1998 | Olgren ............... B62D 1/184 280/777 |
| 6,092,957 A * | 7/2000 | Fevre .................. B62D 1/184 280/775 |

(Continued)

FOREIGN PATENT DOCUMENTS

| DE | 102006028832 A | 12/2007 |
| DE | 102008016742 A | 11/2009 |

(Continued)

OTHER PUBLICATIONS

English Translation of International Search Report issued in PCT/EP2016/064936, dated Sep. 7, 2016 (dated Sep. 15, 2016).

*Primary Examiner* — Nicole T Verley
(74) *Attorney, Agent, or Firm* — thyssenkrupp North America, Inc.

(57) ABSTRACT

A locking device for a steering column may include an activating lever attached to a clamping bolt, which lever interacts with a pressure plate such that when the activating lever is rotated about an axis of the clamping bolt in a closing direction the steering column is clamped in the locking device, and such that when the activating lever is rotated in the opening direction the steering column can be adjusted. An abutment finger may be radially spaced apart from the clamping bolt and project in a direction of the axis of the clamping bolt. The abutment finger may engage in a window-like slot of the activating lever so that rotation of the activating lever is possible but limited in the opening and closing directions by abutment of the abutment finger (Continued)

against opposite abutment surfaces of the window-like slot, at least one which may comprise a damping cover.

14 Claims, 2 Drawing Sheets

(56) References Cited

U.S. PATENT DOCUMENTS

| | | | | |
|---|---|---|---|---|
| 6,851,332 B2* | 2/2005 | Bechtel | ............... | B62D 1/184 74/492 |
| 6,886,859 B2* | 5/2005 | Braun | ............... | B62D 1/184 280/775 |
| 7,415,908 B2* | 8/2008 | Zernickel | ............... | B62D 1/184 280/775 |
| 7,735,868 B2* | 6/2010 | Ridgway | ............... | B62D 1/184 280/775 |
| 9,393,986 B1* | 7/2016 | Anspaugh | ............... | B62D 1/184 |
| 9,428,214 B2* | 8/2016 | Ku | ............... | B62D 1/184 |
| 9,522,693 B2* | 12/2016 | Tomaru | ............... | B62D 1/184 |
| 9,580,100 B2* | 2/2017 | Tomiyama | ............... | B62D 1/187 |
| 9,764,757 B2* | 9/2017 | Buzzard | ............... | B62D 1/184 |
| 9,840,269 B2* | 12/2017 | Tanaka | ............... | B62D 1/189 |
| 10,207,732 B2* | 2/2019 | Schlanzke | ............... | B60O 1/1469 |
| 2004/0104565 A1* | 6/2004 | Tsuji | ............... | B62D 1/184 280/775 |
| 2006/0196302 A1* | 9/2006 | Hochmuth | ............... | B62D 1/184 74/492 |
| 2006/0273567 A1* | 12/2006 | Fix | ............... | B62D 1/184 280/775 |
| 2008/0191457 A1* | 8/2008 | Ridgway | ............... | B62D 1/184 280/775 |
| 2009/0019963 A1* | 1/2009 | Hubrecht | ............... | B62D 1/184 74/493 |
| 2015/0090068 A1* | 4/2015 | Anspaugh | ............... | B62D 1/184 74/493 |
| 2016/0144884 A1* | 5/2016 | Butler | ............... | B62D 1/187 74/495 |
| 2017/0361862 A1* | 12/2017 | Charvet | ............... | B62D 1/185 |

FOREIGN PATENT DOCUMENTS

| | | |
|---|---|---|
| DE | 102012100486 B | 2/2013 |
| DE | 102011055410 A | 5/2013 |
| DE | 102011057104 A | 7/2013 |
| DE | 102012112890 B | 1/2014 |
| EP | 1683702 A1 * | 7/2006 ............ B62D 1/184 |
| GB | 2433103 A | 6/2007 |

* cited by examiner

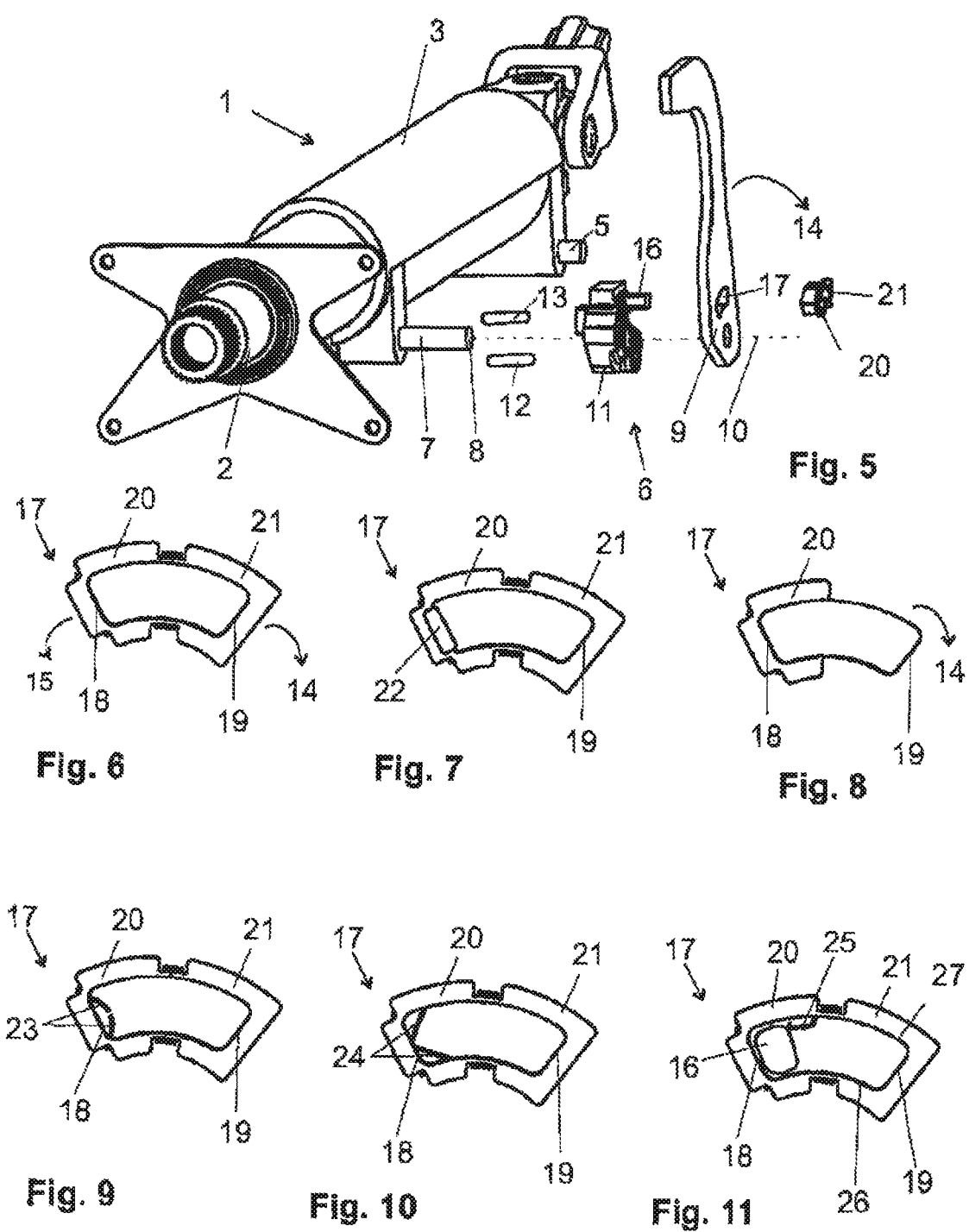

LOCKING DEVICE FOR AN ADJUSTABLE STEERING COLUMN OF A MOTOR VEHICLE

CROSS REFERENCE TO RELATED APPLICATIONS

This application is a U.S. National Stage Entry of International Patent Application Serial Number PCT/EP2016/064936, filed Jun. 28, 2016, which claims priority to German Patent Application No. DE 10 2015 212 688.9, filed Jul. 7, 2015, the entire contents of both of which are incorporated herein by reference.

FIELD

The present disclosure generally relates to steering columns of motor vehicles, including locking devices for adjustable steering wheel columns in motor vehicles.

BACKGROUND

Locking devices of this type are known, for example, from DE 10 2012 100 486 B3 or DE 10 2011 055 410 A1. In the known locking devices, dampers for damping the movement of the activating lever are also provided so that the latter does not cause any metallic noises in the end abutment regions. Furthermore, US 2015/0090068 A1 discloses a locking device with a damping arrangement for the activating lever, wherein, in the release position, a roller buffer contacts a travel limiter. A disadvantage here is that it is complex to produce such a lever. In addition, it could occur that a roller buffer which has become worn over time is no longer able to ensure the noise damping.

Thus a need exists for a locking device that permanently and reliably damps the noise when the activating lever is locked and unlocked, can be produced easily, and saves structural space.

BRIEF DESCRIPTION OF THE FIGURES

FIG. 5 is a perspective view of an example adjustable steering column with an exploded view of several components of an example locking device.

FIG. 6 is a detailed view of an example window-like slot with an inserted plastic frame on both sides.

FIG. 7 is a detailed view of an example window-like slot with an inserted plastic frame on both sides as in FIG. 6, but with the addition of an example rubber insert.

FIG. 8 is a detailed view of an example window-like slot with an example damping cover on one side.

FIG. 9 is a detailed view as in FIG. 6, but with the addition of an inwardly facing bulge in front of an opening abutment surface.

FIG. 10 is a detailed view as in FIG. 6, but with the addition of two leaf springs in front of an opening abutment surface.

FIG. 11 is a detailed view as in FIG. 6, but with the addition of a bent leaf spring in front of a limiting surface of a window-like slot.

DETAILED DESCRIPTION

Figure 1:
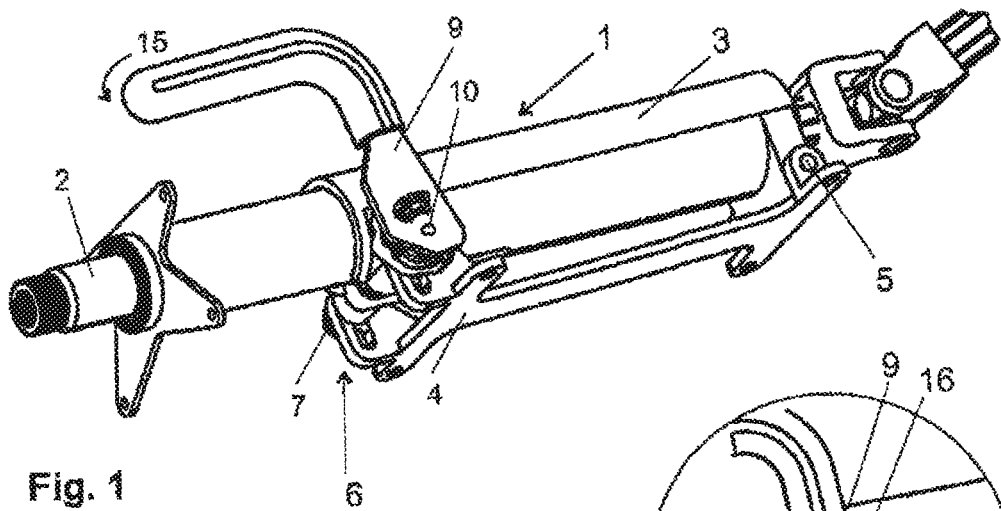
FIG. 1 is a perspective view of an example adjustable steering column of a motor vehicle with an example locking device in a closed state.
Figure 2:
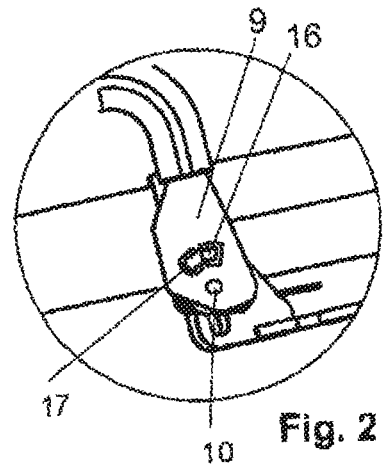
FIG. 2 is a detailed view of a part of the adjustable steering column of FIG. 1.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a locking device for adjustable steering columns of motor vehicles. In some examples, an adjustable steering column may include an activating lever, attached at one end region of a clamping bolt, which interacts with a pressure plate of a clamping mechanism in such a way that, when the activating lever is rotated about the axis of the clamping bolt in the closing direction, a clamping force directed at the axis of the clamping bolt is generated and the steering column is thus clamped in the locking device and, when the activating lever is rotated in the opening direction, the clamping force is reduced so that the clamping action is released and the steering column can be adjusted freely.

In some examples, the pressure plate may comprise an abutment finger arranged radially at a distance from the clamping bolt and projecting in the direction of the axis of the clamping bolt, which engages in a window-like slot of the activating lever so that the rotation of the activating lever is possible but is limited by virtue of the abutment of opposite abutment surfaces of the slot against the abutment finger, both in the opening direction and in the opposing closing direction, and that at least one of the abutment surfaces comprises a damping cover. The damping cover here serves as an abutment damper for the movement of the activating lever at least in the opening direction. The arrangement with a window-like slot, abutment finger, and damping cover has a simple construction and can also be produced easily, only low manufacturing costs being entailed. The wear on the damping cover is low, such that the damping effect of the locking device according to the invention is maintained for a long time. Even if the damping cover does finally become worn, it can be replaced with a new one extremely easily and by expending the least amount of effort. The damping cover can be manufactured from a natural or synthetic elastomer or a plastic. Hereafter, the term plastic used in connection with the cover encompasses a natural elastomer or a synthetic elastomer, to avoid the need to list them each time.

According to a preferred embodiment, an opening abutment surface forming the abutment in the opening direction of the activating lever is provided with the damping cover. In this embodiment, the movement of the activating lever in the opening direction is damped. If it is intended for the movement of the activating lever to be damped in the closing direction too, an embodiment is recommended in which both of the abutment surfaces comprise the damping cover. In this case, it is advantageous if the damping cover takes the form of a plastic frame which covers both abutment surfaces and two limiting surfaces, connecting the two abutment surfaces, of the window-like slot.

The plastic frame can be designed as a single piece or as multiple pieces, wherein the said limiting surfaces of the window-like slot are not covered completely by a multi-part plastic frame.

The damping effect can be improved further by the measure of the damping cover additionally comprising, at the opening abutment surface, a damping element for damping the movement of the activating lever. As a result, the kinetic energy of the activating lever is damped even more effectively when it contacts the damping element on the opening abutment surface.

If it is intended for the noises to be particularly well damped on abutment of the activating lever in the closing direction too, it is recommended that the damping cover also additionally comprises, on a closing abutment surface forming the abutment in the closing direction of the activating lever, a damping element for damping the movement of the activating lever.

In a simple alternative of the abovementioned embodiment, the damping element is a rubber insert. This can be provided in a particularly cost-effective fashion.

In a second alternative embodiment, the damping element takes the form of one or two leaf springs.

In a third advantageous alternative embodiment, the damping element can also take the form of a bulge facing inward.

The invention can be improved further by the measure of the radial distance, with respect to the axis of the clamping bolt, between the limiting surfaces of the window-like slot reducing in the direction of the opening abutment surface such that the abutment finger is clamped with increasing force between the two limiting surfaces as one approaches the opening abutment surface. As a result, the movement of the activating lever in the opening direction is decelerated and the force of the impact on the abutment surface thus damped.

In a further embodiment of the invention, it is provided that one of the limiting surfaces is provided with a bent leaf spring in such a way that, when the activating lever is activated in the opening direction, said leaf spring is first compressed by the abutment finger as it slides past and is then relaxed again when the abutment finger lies against the opening abutment surface and thus presses the abutment finger against the opening abutment surface. The lever opening force is increased by the leaf spring.

In a variation of the concept of the invention, instead of the abutment finger, the clamping bolt can be guided through the window-like slot in order likewise to improve the damping when the activating lever is in abutment at least in the opening direction, but preferably also in the closing direction, and to suppress unwanted noise.

Figure 3:
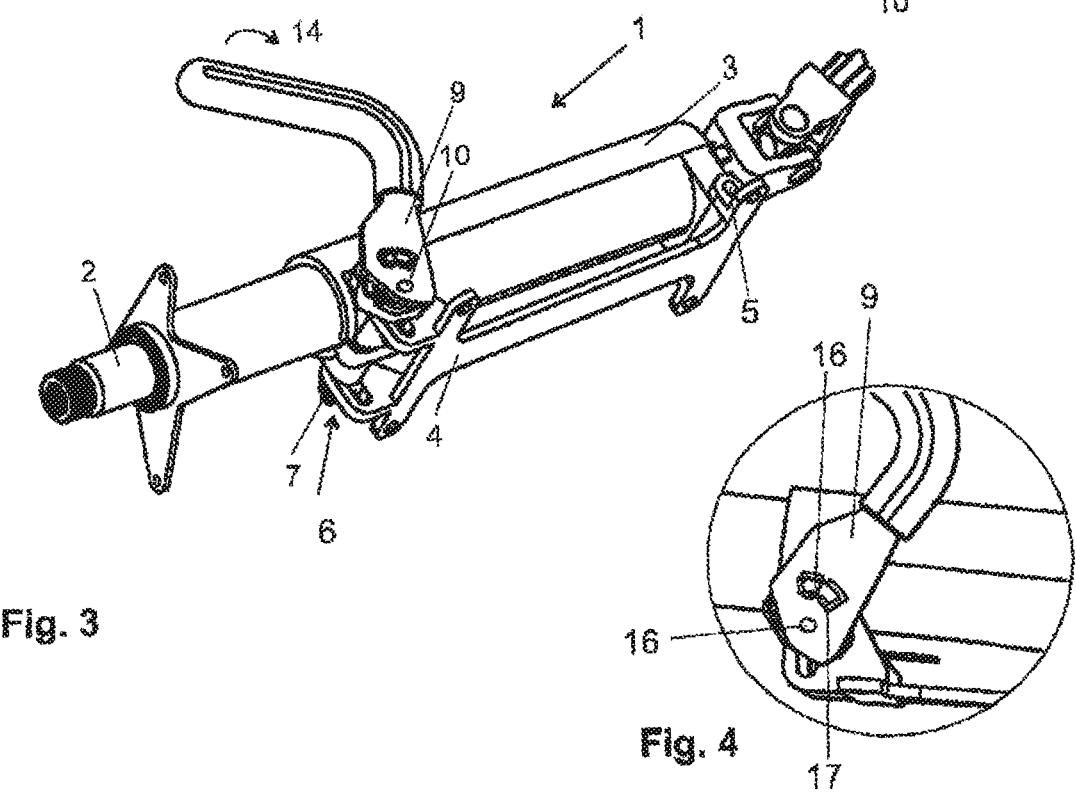
FIG. 3 is a perspective view of an example adjustable steering column of a motor vehicle with an example locking device in an open state.
Figure 4:
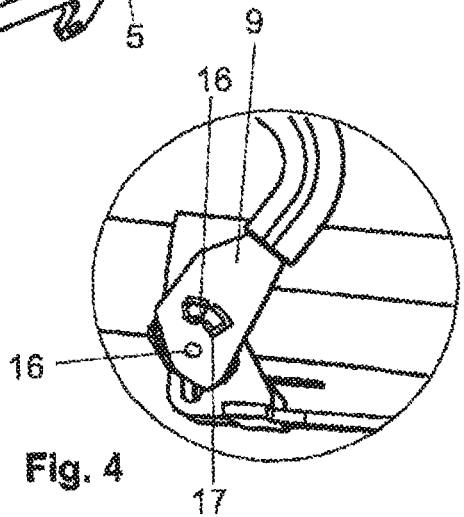
FIG. 4 is a detailed view of a part of the adjustable steering column of FIG. 3.

In FIGS. 1, 3 and 5, an adjustable steering column 1 of a motor vehicle can be seen, in which a steering shaft 2 is rotatably mounted in a steering shaft bearing unit 3. The steering shaft bearing unit 3 is moreover mounted on a support unit 4 which is to be fastened to the vehicle bodywork (not shown) so that it can pivot about an axis of pivoting 5. In order to fix the steering shaft bearing unit 3 on the support unit 4 at a preselected angle of pivoting, a locking device 6 is provided which is arranged essentially on the steering shaft bearing unit 3 and interacts with the support unit 4.

The locking device 6 comprises a clamping bolt 7 which is connected at one end region 8 to an activating lever 9 such that the axis 10 of the clamping bolt passes through the activating lever 9. Moreover, a pressure plate 11, which interacts with two pins 12, 13 arranged between the pressure plate 11 and the activating lever 9, is arranged on the clamping bolt 7 such that, when the activating lever 9 is activated, these pins 12, 13 are rotated about the axis 10 of the clamping bolt with respect to the pressure plate 11. The pins 12, 13 thus assume a new angular position with respect to the axis 10 of the clamping bolt such that their length projected onto the axis 10 of the clamping bolt is changed. A rotation in the opening direction 14 (FIGS. 3 and 5) entails a shortening of the projected length, which causes the clamping action of the locking device 6 to be loosened such that the steering shaft bearing unit 3 can pivot about the axis 5 of pivoting with respect to the support unit 4, because the clamping force of the clamping bolt 7 is reduced as a result of the shortening of the projected length in the opening direction 14. If, in contrast, the activating lever 9 moves in the closing direction 15 (see FIG. 1), the rotation of the activating lever 9 in conjunction with the pins 12, 13 and the pressure plate 11 causes a lengthening of the projected length, which causes a clamping of the locking device 6 in the direction of the axis 10 of the clamping bolt such that the steering shaft bearing unit 3 is connected immovably to the support unit 4 by means of the locking device 6. The pins 12, 13 are therefore known as tilt pins.

It should, however, be noted that the invention can also be applied to an alternative embodiment (not shown here) of the locking device.

In particular, in a further advantageous embodiment of the invention, cam elements or rolling bodies as known from the prior art can be used instead of the tilt pins 12, 13. The pressure plate is then formed by a cam which is rotated against a counter-cam. The rolling bodies proposed as an alternative then run on the cam to form a rolling contact instead of a sliding contact.

It is also conceivable and possible that, when the activating lever is rotated about the axis of the clamping bolt, the clamping bolt itself is not rotated but a relative rotation of the cam elements or the tilt pins is obtained.

The rotational movement of the activating lever 9 is limited both in the opening direction 14 and in the closing direction 15 by the pressure plate 11 being provided with an abutment finger 16 which is arranged on the pressure plate 11 at a radial distance from the axis 10 of the clamping bolt and projects in the direction 10 of the clamping bolt from the pressure plate 11 to the activating lever 9. The activating lever 9 is provided with a window-like slot 17 into which the abutment finger 16 projects. The window-like slot 17 is extended so far in the direction of rotation 14, 15 of the activating lever 9 that the activating lever 9 can sweep a predetermined angular region until the abutment finger 16 of the pressure plate 11 abuts against one of two abutment surfaces 18, 19 of the window-like slot 17. As a result, the movement of the activating lever 9 is limited, and to be precise both in the opening direction 14 and in the closing direction 15.

As can be seen in FIG. 8, the opening abutment finger 18, by means of which the abutment finger 16 limits the movement of the activating lever 9 in the opening direction 14, is provided with an essentially C-shaped damping cover 20 which in the example is designed as a plastic frame part which damps the impact of the opening abutment surface 18 of the activating lever 9 on the abutment finger 16.

In the exemplary embodiment according to FIG. 6, in addition to the plastic frame part 20 which covers the opening abutment surfaces 18, a second plastic frame part 21 is provided which covers the closing abutment surface 19 and hence additionally damps the impact of the closing abutment surface 19 of the activating lever 9 on the abutment finger 16 when the locking device 6 according to the invention is closed and hence clamped. The two plastic frame parts 20, 21 can be designed so that they are separate from each other or as a single piece as a complete plastic frame 20, 21 which entirely encloses the window-like slot 17, and preferably as a two-component part.

In the alternative embodiment shown in FIG. 7, a rubber insert 22 is additionally provided as a damping element in order to improve the damping effect. The rubber insert 22 is arranged on the opening abutment surface 18.

In the alternative embodiment according to FIG. 9, an inward-facing bulge 23 made from plastic material, which damps the opening movement of the activating lever 9 particularly well as a damping element, is arranged on the opening abutment surface 18.

In the alternative embodiment according to FIG. 10, two leaf springs 24 are arranged on the opening abutment surface 18 as damping elements in order to effectively damp the opening movement of the activating lever 9.

In the embodiment according to FIG. 11, a bent leaf spring 25 is arranged on one of two limiting surfaces 26, 27 which connect the opening abutment surface 18 and the closing abutment surface 19 of the window-like slot 17 to each other. The bent leaf spring 25 is compressed when the abutment finger 16 slides past and then, in the relaxed or partially relaxed state, holds the abutment finger 16 lying against the opening abutment surface 18.

The said limiting surfaces 26, 27 of the window-like slot 17 do not necessarily have to have the same spacing from each other over the whole width of the window-like slot 17. In a development of the invention, it is even provided that the radial distance, with respect to the axis 10 of the clamping bolt, between the limiting surfaces 26, 27 reduces in the direction of the opening abutment surface 18 such that the abutment finger 16 is clamped with increasing force between the two limiting surfaces 26 and 27 as one gets closer to the opening abutment surface 18. As a result, the opening movement of the activating lever 9 in the opening direction 14 is particularly well decelerated and damped.

LIST OF REFERENCE NUMERALS 1 steering column
2 steering shaft
3 steering shaft bearing unit
4 support unit
5 axis of pivoting
6 locking device
7 clamping bolt
8 end region
9 activating lever
10 axis of the clamping bolt
11 pressure plate
12 pin
13 pin
14 opening direction
15 closing direction
16 abutment finger
17 window-like slot
18 opening abutment surface
19 closing abutment surface
20 damping cover
21 damping cover
22 rubber insert
23 bulge
24 leaf springs
25 bent leaf spring
26 limiting surface
27 limiting surface

What is claimed is:

1. A locking device for a steering column of a motor vehicle, the locking device comprising:
a clamping bolt;
a pressure plate that includes an abutment finger; and
an activating lever attached at an end region of the clamping bolt, wherein the activating lever interacts with the pressure plate such that rotation of the activating lever about an axis of the clamping bolt in a closing direction generates a clamping force directed along the axis of the clamping bolt that clamps the steering column in the locking device, and such that rotation of the activating lever about the axis of the clamping bolt in an opening direction reduces the clamping force so that the steering column is adjustable,
wherein the abutment finger of the pressure plate is spaced radially apart from the clamping bolt and projects in a direction of the axis of the clamping bolt, the abutment finger engaging in a window-like slot having the form of a closed-sided opening formed through the activating lever such that the activating lever is rotatable but such that rotation of the activating lever in the opening direction and in the closing direction is limited by abutment of the abutment finger against opposite abutment surfaces of the window-like slot, at least one of which opposite abutment surfaces includes a separate damping cover which is configured to be removably affixable to the window-like slot.

2. The locking device of claim 1 wherein the opposite abutment surface that limits rotation of the activating lever in the opening direction comprises the damping cover.

3. The locking device of claim 1 wherein the damping cover is a first damping cover, wherein a first of the opposite abutment surfaces includes the first damping cover and a second of the opposite abutment surfaces includes a second damping cover.

4. The locking device of claim 1 wherein the damping cover is configured as a plastic frame that covers both of the opposite abutment surfaces and two limiting surfaces, wherein the two limiting surfaces connect the opposite abutment surfaces of the window-like slot.

5. The locking device of claim 1 wherein the damping cover comprises on the opposite abutment surface that limits rotation of the activating lever in the opening direction a damping element for damping movement of the activating lever.

6. The locking device of claim 5 wherein the damping element is a rubber insert.

7. The locking device of claim 5 wherein at least one of the damping elements is an inward-facing bulge.

8. The locking device of claim 5 wherein at least one of the damping elements is a leaf spring.

9. The locking device of claim 5 wherein the damping cover further comprises on the opposite abutment surface that limits rotation of the activating lever in the closing direction a damping element for damping movement of the activating lever.

10. The locking device of claim 9 wherein both of the damping elements are rubber inserts.

11. The locking device of claim 9 wherein at least one of the damping elements is a leaf spring.

12. The locking device of claim 9 wherein at least one of the damping elements is an inward-facing bulge.

13. The locking device of claim 1 wherein two limiting surfaces connect the opposite abutment surfaces of the window-like slot of the activating lever, wherein a radial distance between the two limiting surfaces and taken with respect to the axis of the clamping bolt decreases towards the opposite abutment surface that limits rotation of the activating lever in the opening direction so that the abutment finger is clamped with an increasing amount of force between the two limiting surfaces as the abutment finger approaches the opposite abutment surface that limits rotation of the activating lever in the opening direction.

14. The locking device of claim 1 wherein two limiting surfaces connect the opposite abutment surfaces of the window-like slot of the activating lever, wherein one of the two limiting surfaces includes a bent leaf spring, wherein rotation of the activating lever in the opening direction causes the bent leaf spring to be compressed by the abutment finger as the abutment finger slides past the bent leaf spring and thereafter causes the bent leaf spring to relax and press the abutment finger against the opposite abutment surface that limits rotation of the activating lever in the opening direction.

\* \* \* \* \*